United States Patent
Khan et al.

(10) Patent No.: US 12,430,319 B2
(45) Date of Patent: Sep. 30, 2025

(54) PROACTIVE DATABASE MANAGEMENT SYSTEMS

(71) Applicant: Truist Bank, Charlotte, NC (US)

(72) Inventors: Tufail Ahmed Khan, Raleigh, NC (US); Scott Howard Magoon, Cary, NC (US); Pranjal Goswami, Knightdale, NC (US); Di Hu, Raleigh, NC (US); Changyong Wei, Suwanee, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/524,638

(22) Filed: Nov. 30, 2023

(65) Prior Publication Data

US 2025/0181571 A1    Jun. 5, 2025

(51) Int. Cl.
*G06F 16/00*    (2019.01)
*G06F 11/34*    (2006.01)
*G06F 16/215*   (2019.01)
*G06F 16/23*    (2019.01)

(52) U.S. Cl.
CPC ...... *G06F 16/2365* (2019.01); *G06F 11/3409* (2013.01); *G06F 16/215* (2019.01)

(58) Field of Classification Search
None
See application file for complete search history.

(56) References Cited

U.S. PATENT DOCUMENTS

| | | |
|---|---|---|
| 4,994,990 A | 2/1991 | Fujita |
| 9,558,245 B1 | 1/2017 | Gao |
| 11,232,365 B2 | 1/2022 | Sundararaman |
| 11,755,552 B2 | 9/2023 | Walters |
| 2011/0173222 A1* | 7/2011 | Sayal ............... G06F 16/215 707/769 |
| 2016/0188898 A1 | 6/2016 | Karinta |
| 2017/0364553 A1 | 12/2017 | Jacob |
| 2018/0060738 A1 | 3/2018 | Achin |
| 2019/0138628 A1* | 5/2019 | Walker ............. G06F 40/295 |
| 2019/0272335 A1 | 9/2019 | Liu |
| 2020/0050949 A1 | 2/2020 | Sundararaman |
| 2020/0242134 A1 | 7/2020 | Salhin |
| 2020/0327097 A1 | 10/2020 | Birka |
| 2020/0351383 A1 | 11/2020 | Jayaraman et al. |
| 2021/0042656 A1 | 2/2021 | Watson |

(Continued)

*Primary Examiner* — Anhtai V Tran

(74) *Attorney, Agent, or Firm* — Michael A. Springs, Esq.; Shumaker, Loop & Kendrick, LLP; Patrick B. Horne

(57) ABSTRACT

Systems and methods receive, by a backend system and from a user device, input(s) indicating dataset(s) should be stored to storage location(s) of the backend system, and dynamically compare data of the dataset(s) to stored data of stored dataset(s), the comparing including applying the dataset(s) to a deployed predictive model that is trained to quantify a percentage of similarity between the dataset(s) and the stored dataset(s). Based on the applying, it is dynamically determined that the percentage of similarity of one dataset of the dataset(s) surpasses a predefined threshold percentage, and electronic notification(s) indicating the percentage of similarity between the one dataset and a stored dataset of the dataset(s) is transmitted to the user device based on the percentage of similarity surpassing the predefined threshold percentage.

20 Claims, 16 Drawing Sheets

(56) References Cited

U.S. PATENT DOCUMENTS

| | | |
|---|---|---|
| 2021/0240699 A1* | 8/2021 | Smith ................... G06F 7/14 |
| 2021/0365344 A1 | 11/2021 | Bui |
| 2021/0397737 A1* | 12/2021 | De Berker ............ G06F 18/214 |
| 2022/0035866 A1 | 2/2022 | Carrier |
| 2022/0138561 A1 | 5/2022 | Prendki |
| 2022/0215552 A1 | 7/2022 | Rohani |
| 2023/0088474 A1 | 3/2023 | Sragow et al. |
| 2024/0061952 A1 | 2/2024 | Kwok |
| 2024/0112486 A1 | 4/2024 | Chen et al. |
| 2024/0233010 A1 | 7/2024 | Moshyedi |
| 2024/0427645 A1 | 12/2024 | Darji |

\* cited by examiner

PROACTIVE DATABASE MANAGEMENT SYSTEMS

FIELD OF THE INVENTION

This invention relates generally to the field of database management, and more particularly embodiments of the invention relate to systems and methods used to manage data.

BACKGROUND OF THE INVENTION

Data procurement is essential for various enterprise objectives. However, storing this data can be expensive, both in terms of the number of resources required to store the data as well as expenses that are paid to third-party hosting services. In large organizations, there may be many teams that access the same datasets for various projects. Often, duplicate datasets are stored to various databases and/or servers, which increases infrastructure costs. Further, when data is pulled from duplicate datasets for data processing, this can skew data analysis and lead to inaccurate conclusions. Thus, a need exists for improved systems and methods that improve database management.

BRIEF SUMMARY

Shortcomings of the prior art are overcome and additional advantages are provided through the provision of a computing system for proactive database management. The system includes at least one processor, a communication interface communicatively coupled to the at least one processor, and a memory device storing executable code that, when executed, causes the at least one processor to, at least in part, receive, by a backend system and from a user device, one or more inputs indicating that one or more datasets should be stored to one or more storage locations of the backend system. Data of the one or more datasets is dynamically compared to stored data of one or more stored datasets, where the comparing includes applying the one or more datasets to a deployed predictive model that is trained to quantify a percentage of similarity between the one or more datasets and the one or more stored datasets. Further, it is dynamically determined, based on the applying, that the percentage of similarity of one dataset of the one or more datasets surpasses a predefined threshold percentage. One or more electronic notifications that indicate the percentage of similarity between the one dataset and a stored dataset of the one or more stored datasets is transmitted to the user device based on the percentage of similarity surpassing the predefined threshold.

Additionally, disclosed herein is a computing system facilitating database management, where the computing system includes at least one processor, a communication interface communicatively coupled to the at least one processor, and a memory device storing executable code that, when executed, causes the at least one processor to receive, via a graphical user interface of a user device, one or more user inputs indicating that a data file should be stored to one or more database storage locations of a backend system. Further, a request is transmitted to the backend system to store the data file to the one or more database storage locations. In response to the request, an indication that the data file includes data that is likely duplicative of a stored dataset stored to the one or more databased storage locations is received, where the indication includes a percentage of similarity between the data file and the stored data. A prompt is displayed via the graphical user interface that indicates the percentage of similarity between the data file and the stored dataset.

Also disclosed herein is a computer-implemented method that includes receiving, by a backend system and from a user device, one or more inputs indicating that one or more datasets should be stored to one or more storage locations of the backend system. Further, the method includes dynamically comparing data of the one or more datasets to stored data of one or more stored datasets, the comparing comprising applying the one or more datasets to a deployed predictive model that is trained to quantify a percentage of similarity between the one or more datasets and the one or more stored datasets. The method also includes dynamically determining, based on the applying, that the percentage of similarity of one dataset of the one or more datasets surpasses a predefined threshold percentage, and transmitting, to the user device and based on the percentage of similarity surpassing the predefined threshold percentage, one or more electronic notifications that indicate the percentage of similarity between the one dataset and a stored dataset of the one or more stored datasets.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
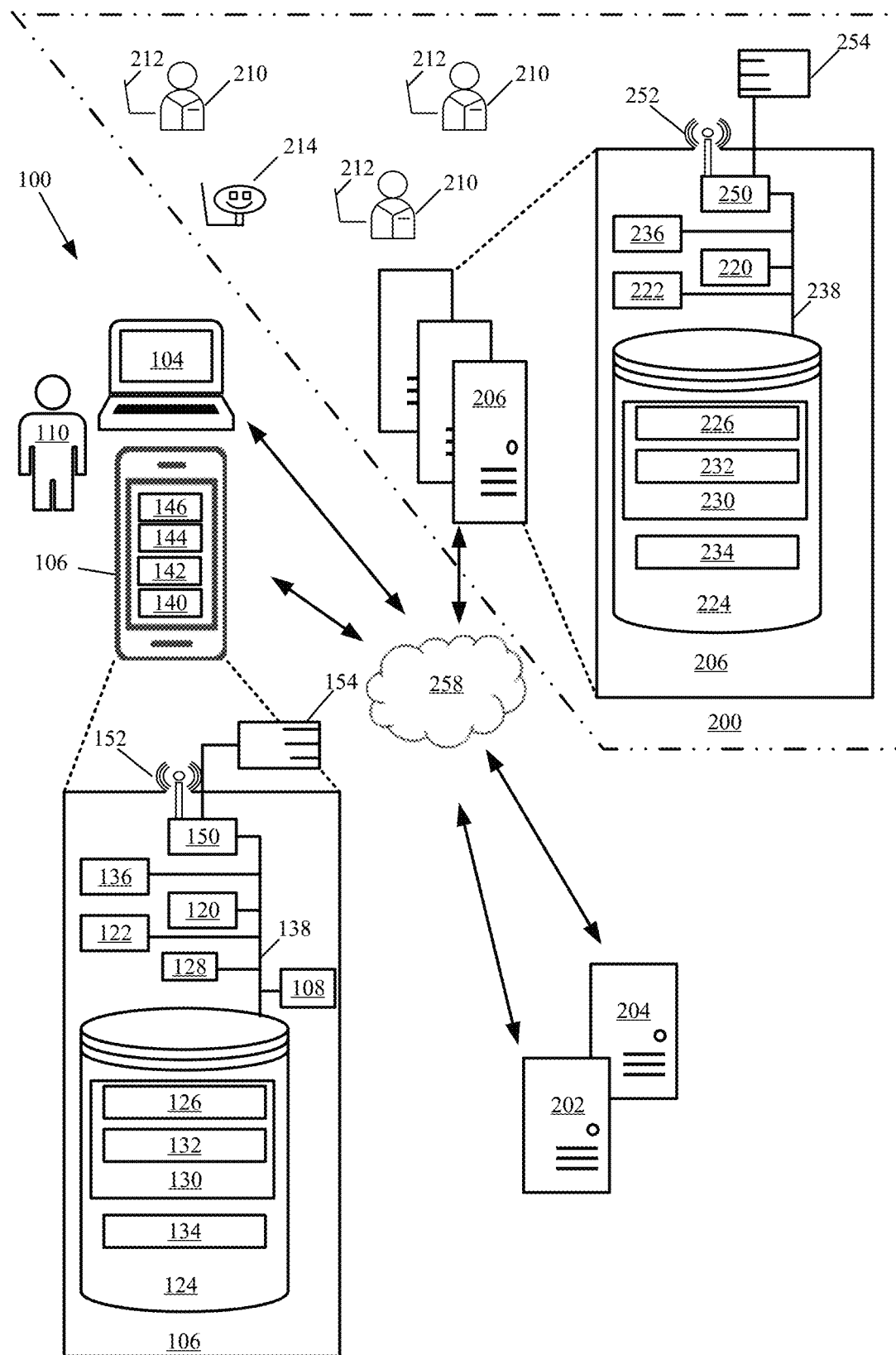
FIG. 1 illustrates an enterprise system, and environment thereof to facilitate data management, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Like numbers refer to like elements throughout. Unless defined otherwise, technical and scientific terms used herein have the same meaning as commonly understood to one of ordinary skill in the art to which the presently disclosed subject matter pertains.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Furthermore, a device or structure that is configured in a certain way is configured in at least that way, but may also be configured in ways that are not listed.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

As used herein, the terms "enterprise" or "provider" generally describes a person or business enterprise (e.g., company, organization, institution, business, university, etc.) that hosts, maintains, or uses computer systems that provide functionality for the disclosed systems and methods. The term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer system to provide access to a video game to a user device system, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (e.g., a private cloud, public cloud, community cloud, and/or hybrid cloud), an on-premise environment, fog-computing environment, and/or an edge-computing environment. The user 110 accesses services and/or products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, radio buttons, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and/or products to one or more users 110. In non-limiting examples, services and/or products may include retail services and products, information services and products, custom services and products, predefined or pre-offered services and products, consulting services and products, advising services and products, forecasting services and products, internet products and services, social media, data hosting, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to the network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with various applications. In particular, the enterprise system 200 may include an enterprise mobile software application that includes a banking functionality that may be installed on or otherwise accessed by the user device 104, 106. When the user 110 accesses the banking functionality, the user 110 may perform various financial transactions.

In order to facilitate the banking functionality, a virtual agent 214 or one or more human agents 210 may access third party systems using a software application compatible with the third party system that can be integrated with the virtual agent 214 and/or agent computing device 212 such as, for example, an integrated mobile software application or an application programming interface (API) software application that facilitates communication between software and systems by mapping computer-readable commands and data formats between systems. In another embodiment, the virtual agent 214 and/or agent computing device 212 access the third party system using a web browser application software to access a web-based software interface (e.g., a website). According to one embodiment, in order to perform various banking functionalities, a user 110 may initiate an interaction with the enterprise system 200 by providing authentication information.

The enterprise system 200 can access one or more databases that store various types of data (e.g., user data, transaction data, enterprise data, marketing data, system data, etc.) that is accumulated by the enterprise. According to one example, words and language may be interpreted and understood by the enterprise system 200 using various natural language processing (NLP), which may include natural language understanding (NLU) processes. Such NLP may, according to one or more embodiments, utilize third-party software (e.g., Amazon Comprehend®, IBM® Watson Assistant, etc.). When a user types words into documents, tables, etc., the these documents, tables, files, etc. may be stored to the storage device 224 and/or the third party storage resource (e.g., cloud storage service or remote database) that the enterprise system 200 accesses in order to perform the systems and methods described herein. A NLP functionality processes content data to identify purposes, topics, and subjects addressed within the content data, and various source identifiers (e.g., names of users), content sources, column names, classifiers, descriptions, etc. The interpretation of the information derived by the NLP can provide inputs to a predictive model that can determine whether the content is similar to content of other files, documents, tables, etc.

The documents, tables, files, etc. may be stored to a relational database that maintains the data in a manner that permits the content of such data to be associated with certain information such as, for example, the user 110, enterprise objectives, statistical studies, or various other identifiers or content metadata. Storing such data to various databases further facilitates sorting of the data, retrieving data. Metadata that can be accessed by the enterprise system 200 may include, for example, (a) sequencing data representing the date and time when the data was created or otherwise representing an order or sequence of information, (b) subject identifier data that characterizes the purpose (e.g., subjects or topics) for the user, (c) source identifier data identifying the user 110 such as, for example, a name of the user, a department, a job title or role, etc., (d) provider identifier data identifying the owner of the data, (e) user source data such as a telephone number, email address, user device internet protocol (IP) address, and/or (f) other types of data that can be used by the enterprise system 200 in order to determine whether the data is repetitive, duplicative, redundant, etc.

User computing device(s) 104, 106 access databases of the enterprise system 200 using LAN(s) and/or an Internet browser software application to access cloud server(s) to display a files, documents, tables, etc. In some embodiments, the user computing device transmits data across the LAN(s) and/or Internet, and the enterprise system 200 returns display data that displays information about various datasets stored to the database(s). After receiving provider display data, the user computing device(s) 104, 106 processes the display data and renders GUI screens depicting statistical information, such as a percentage of similarity between datasets.

The user computing device 104, 106 may also transmit, e.g., in response to an input from a user 110, consolidation data to the enterprise system 200 that is used to consolidate datasets. Consolidation data can include, without limitation: (i) a unique identifier for the dataset; (ii) a command to store a dataset to cold storage; (iii) a command to delete a redundant dataset; (iv) a command to merge datasets; and/or (v) various other information needed.

According to various embodiments, NLP technology can be trained and implemented by one or more artificial intelligence software applications and/or systems. The artificial intelligence software applications and/or systems may be implemented, according to various embodiments, using neural networks. NLP technology analyzes one or more data files, documents, tables, json files, etc. that include various communication elements such as (a) alphanumeric data composed of individual words, symbols, numbers, (b) stylistic communication approaches (e.g., abbreviations, acronyms, etc.), and/or (c) various other communication elements that provide meaningful communicative features.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine-learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine-learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine-learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more text pattern recognition algorithms, e.g., a module, subroutine or the like capable of translating text or string characters and/or a language/word recognition module or subroutine. In various embodiments, the machine-learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

Natural language processing software techniques may be implemented using the described machine learning models such as unsupervised learning techniques that identify and characterize hidden structures of unlabeled content data, or supervised techniques that operate on labeled content data and include instructions informing the system which outputs are related to specific input values.

In such instances, supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

Neural networks may perform a supervised learning process where known inputs and known outputs are utilized to categorize, classify, or predict a quality of a future input. However, additional or alternative embodiments of the machine-learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine-learning algorithm may adjust the weight coefficients until any error in the output data generated by the algorithm is less than a predetermined, acceptable level. For instance, the training process may include comparing the generated output, produced by the network in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine-learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, language, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (i.e., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm ("UMAP") can be applied to reduce dimensionality while maintaining essential information.

Prior to conducting a subject analysis to ascertain subjects identifiers in the content data (i.e., topics or subjects addressed in the content data) or sensitive information identifiers in the content data (e.g., information that includes personally identifiable information), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (i.e., topics) addressed within the content data. The subject classification analysis can specifically identify one or more importance identifiers that are the reason why certain data may be important. An interaction driver identifier can be determined by, for example, first determining the subject identifiers having the highest weight quantifiers (e.g., frequencies or probabilities) and comparing such subject identifiers against a database of known importance identifiers.

In one embodiment, the subject classification analysis is performed on the content data using a Latent Dirichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets may be analyzed to determine if the reasons driving a customer support request were identified by the descriptor set subject identifiers.

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject.

In another embodiment, the concentration analysis is performed on unclassified content data by mapping the communication elements within the content data to integer values. The content data is turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero-even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifiers may be substantially different, with some subjects having orders of magnitude fewer subject vectors than other subjects. The weight scoring might significantly favor relatively unimportant subjects that occur frequently in the content data. To address this problem, a linear scaling on the dot product scoring based on the number of subject vectors may be applied.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a NLP analysis include the term "password," that subject can be assigned more weight by the content driver software service in order to determine that this is sensitive information.

The content data can be visualized and subject to a reduction into two-dimensional data using a UMAP to generate a cluster graph visualizing a plurality of clusters. The content driver software service feeds the two dimensional data into a DBSCAN and identify a center of each cluster of the plurality of clusters. The process may, using the two dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The content driver software service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (i.e., a content source).

Polarity-type sentiment analysis (i.e., a polarity analysis) can apply a rule-based software approach that relies on lexicons or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identifier. The polarity identifier can correlate to a polarity score or polarity score range according to settings predetermined by an enterprise. For instance, a polarity score of +5 to +9 may correlate to a polarity identifier of "positive," and a polarity score of +10 or higher correlates to a polarity identifier of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlates to a "somewhat negative" polarity indicator. Similarly, the sentence "I lost my debit card, but the agent was great and got me a new card fast" might be scored as a positive five (+5), thereby reflecting a positive sentiment with a positive polarity score and polarity identifier.

The content driver software service can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, gender, nationality, etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

For some embodiments, the content driver software service can be configured to determine relationships between and among subject identifiers and sentiment identifiers. Determining relationships among identifiers can be accomplished through techniques, such as determining how often two identifier terms appear within a certain number of words of each other in a set of content data packets. The higher the frequency of such appearances, the more closely the identifiers would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Various neural networks exist that may be utilized by various AI systems described herein. For instance, an artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is performed.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine-learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
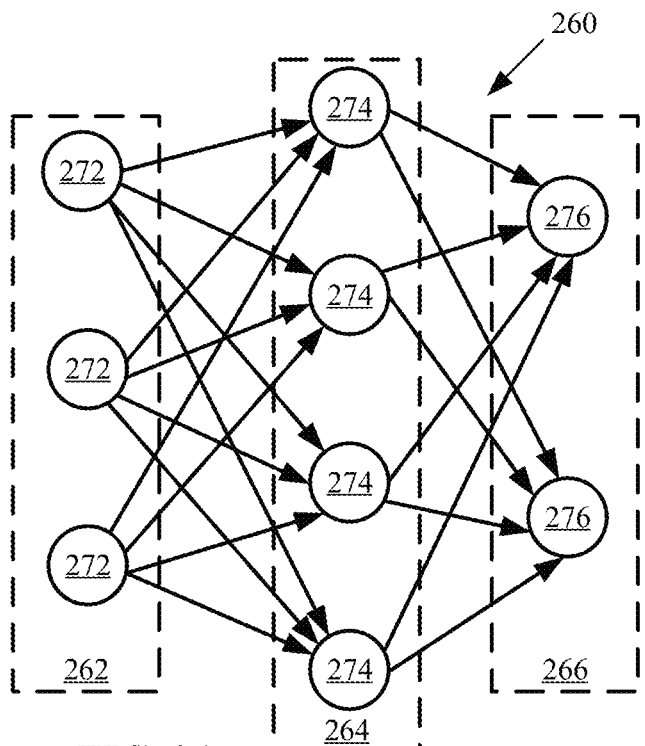
FIG. 2A is a diagram of a feedforward network, according to at least one embodiment, utilized in machine learning.
Figure 2C:
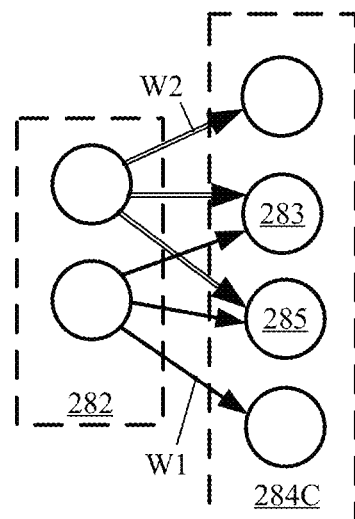
FIG. 2C is a diagram of a portion of the convolution neural network of FIG. 2B, according to at least one embodiment, illustrating assigned weights at connections or neurons.
Figure 2B:
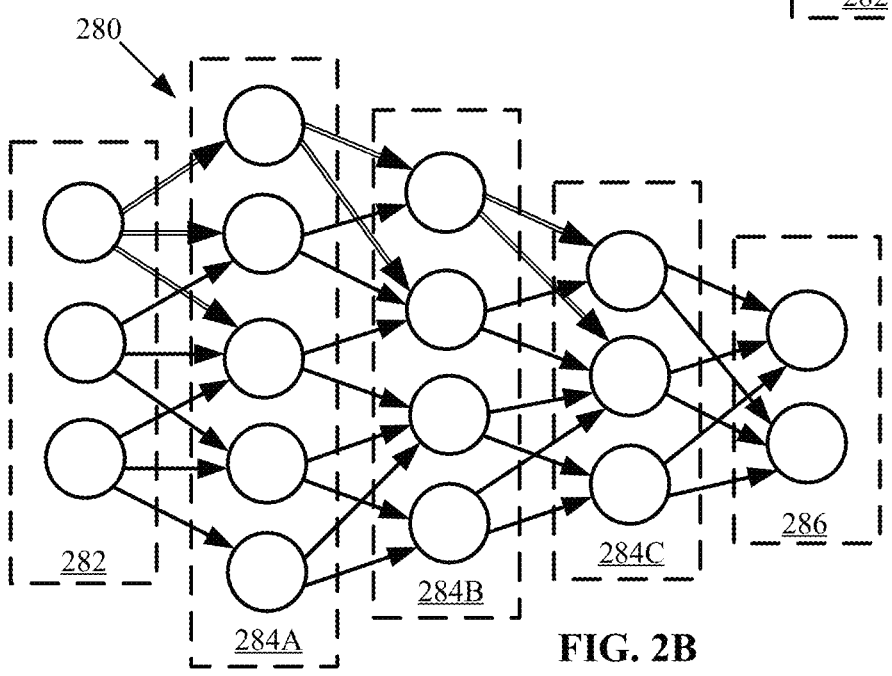
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
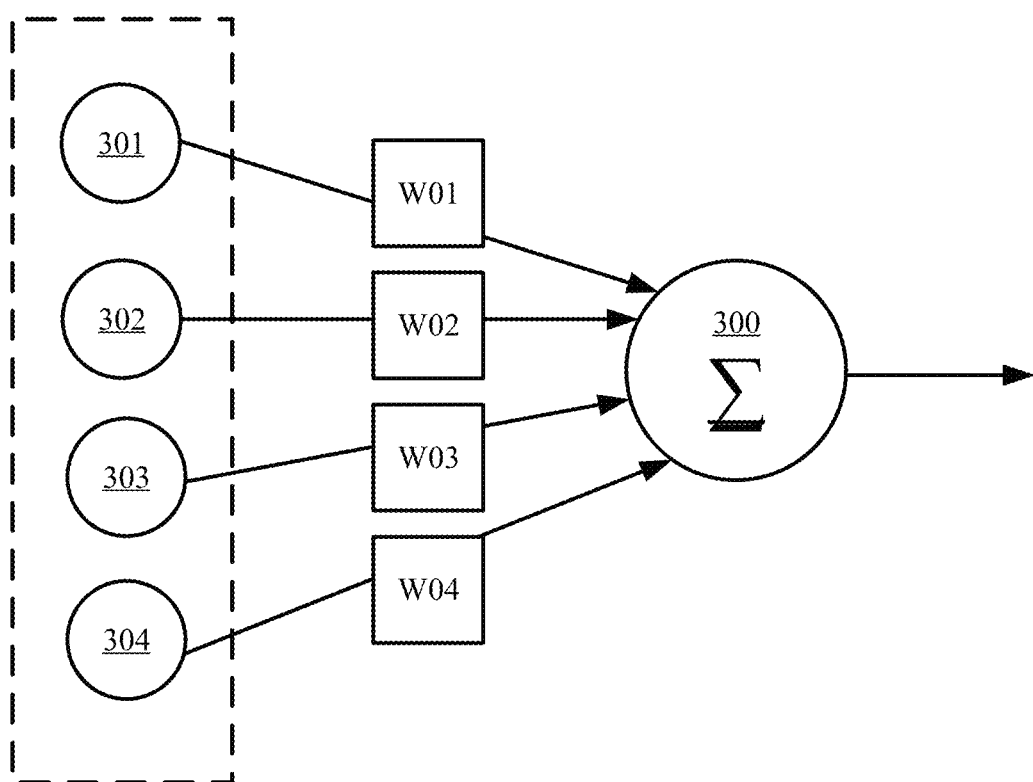
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine-learning program may include a feedback system suitable to provide the connection(s) between subsequent and previous layers of the network.

Figure 4:
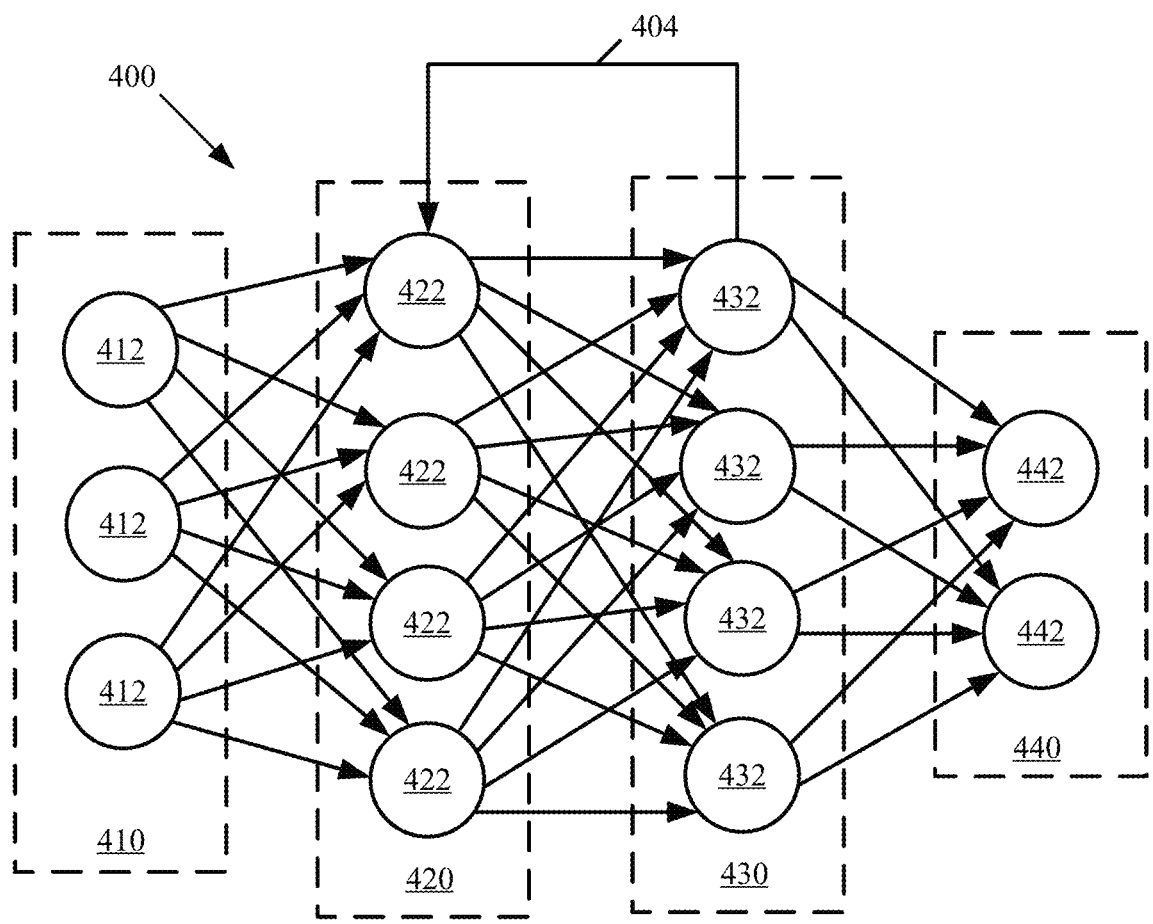
FIG. 4 is a diagram of a Recurrent Neural Network (RNN), according to at least one embodiment, utilized in machine learning.

An example for an RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
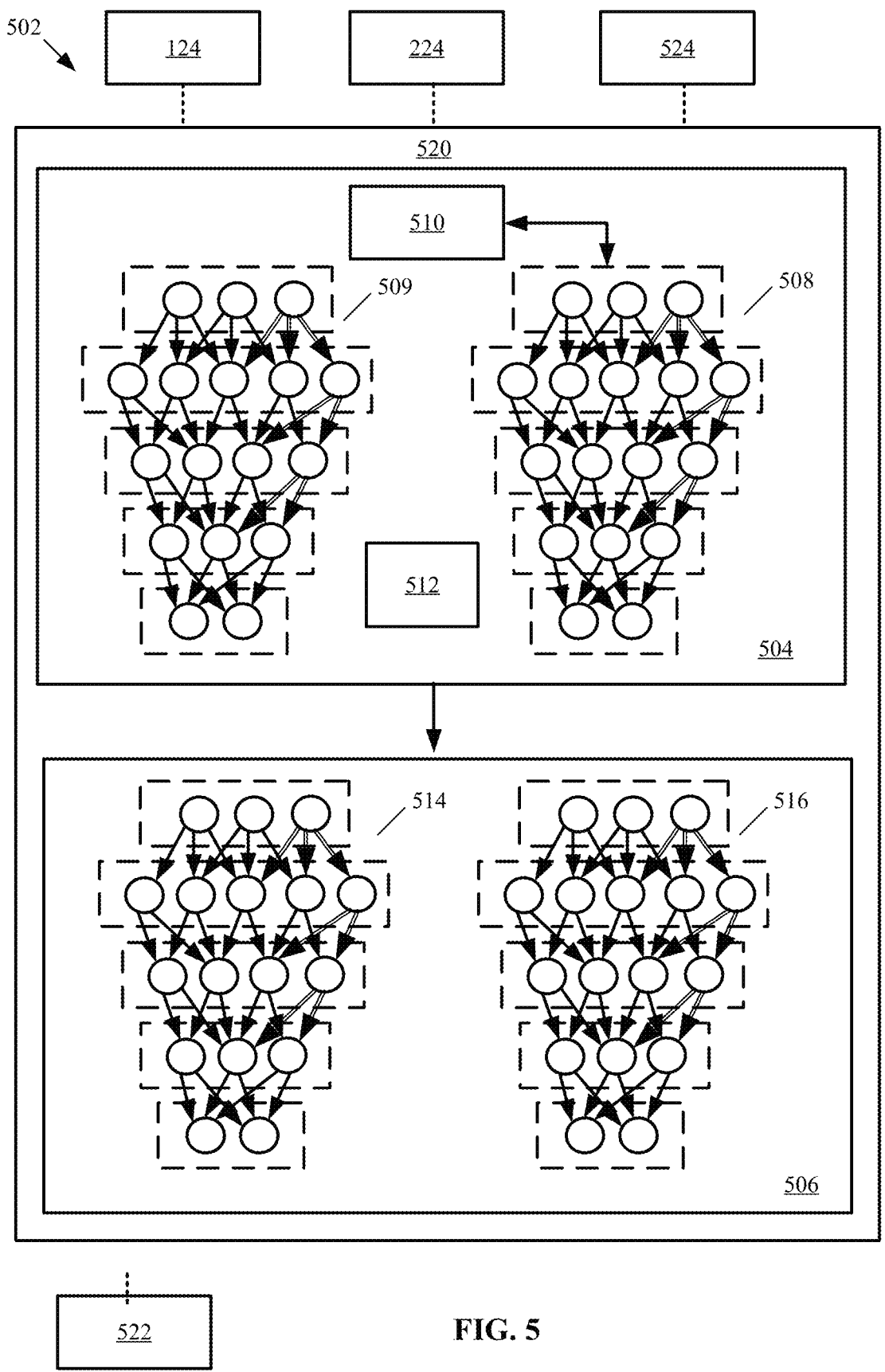
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform preprocessing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, RNNs, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on K-means clustering software processing techniques.

Figure 6:
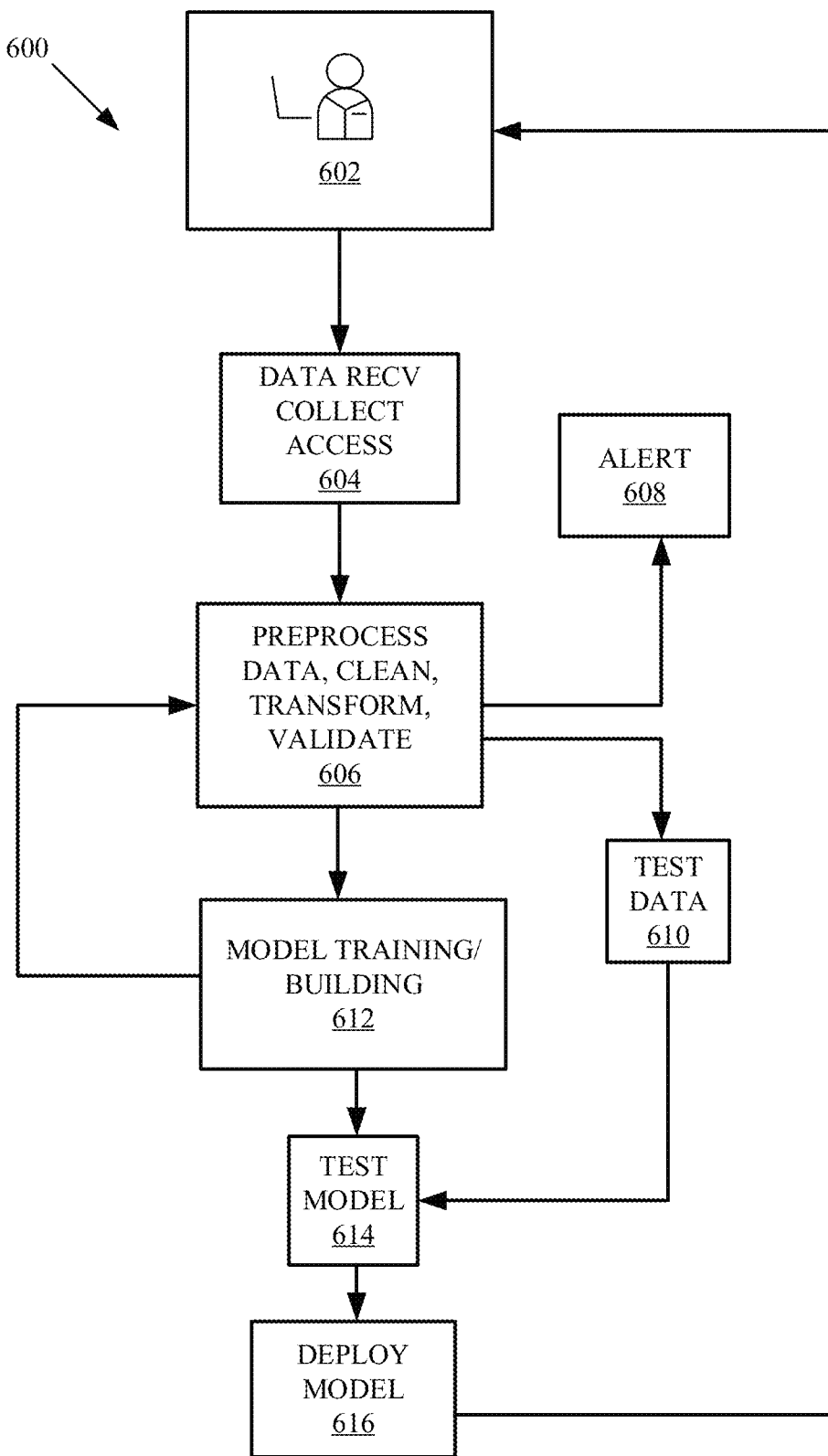
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

NLP techniques or various other textual structuring techniques such as those described herein may be used to process input audio data and/or transcription data. Such data may then be applied to a trained model (including any models described herein) to filter the data and identify pertinent communication elements from the user data and content data including, for example: (a) sequencing data, (b) subject identifier data, (c) weighting data, (d) source identifier data, (e) provider identifier data, (f) user source data, (g) sentiment data, (h) polarity data, (i) resolution data, (j) agent identifier data, and/or (k) other types of data that can be helpful for generating a response within a user interaction. For instance, such data is filtered to determine what information would be relevant for determining similarities between datasets. The data is interpreted when it is applied to the trained model and the data is contextualized.

One of the advantages to the systems and methods disclosed herein is that it applies not only to identical or duplicate datasets, but the systems and methods also provide similarity analysis. By analyzing datasets for similarity, the system may be able to identify subsets of datasets, datasets with essentially the same information expressed slightly differently, datasets from different years, etc. By identifying similar datasets and potential redundancies, the system can identify areas for cost savings by alerting an administrator so that the administrator can review and approve consolidation of these similar datasets.

In addition to the advantages described herein, the systems and methods described herein can review the technical metadata and technical aspects of the datasets, and data governance processes tend to apply a layer of business metadata on top of each dataset that is included in an asset catalog. If datasets are duplicated or one is a subset of another, it is possible that different business metadata would be added to the two similar datasets. A data analyst may then inadvertently include both duplicated datasets in a data analysis, which can skew results of the analysis. In other embodiments, the data analyst may use a version of a dataset that is missing context and other descriptive information that would enhance the analysis. The disclosed systems and methods would assist an administrator in ensuring that proper datasets are available to the teams and groups of the enterprise so that the appropriate analysis is performed.

There are various approaches for identifying similar datasets, these can include a statistical approach where checksums are calculated or hash codes are utilized to determine how the datasets have changed over time. In some implementations, the data can be profiled to provide metrics (e.g., mean value, maximum value or minimum value of a particular column or a particular file, etc.). Once the data has been profiled, a comparison can be performed to determine whether there is a similar range of data values or whether the range is exactly the same. In some implementations, machine learning may be used to determine whether the datasets are similar. For instance, in one example two datasets may be duplicative, but the data values are represented differently and names of users in one dataset are provided by last name whereas names of those same users is provided by first name or by a numeric identifier. The prediction model can be trained to derive meaning from the data and determine that the data are essentially identical.

Once similar datasets are identified, an electronic notification can be sent to an administrator's computing device to notify the administrator of likely similarities as well as a percentage of similarity. The administrator (e.g., a data steward) may then provide an input to merge the datasets together or delete one of the datasets. Alternatively, the administrator may determine that there are reasons for keeping both datasets, and an input may be provided to move a dataset to cold storage.

Another feature of the disclosed systems and methods is that if the data are sensitive (e.g., social security numbers, credit card information, or other personally identifiable information) there are reasons for an entity to implement security measures to protect the sensitive information (e.g., using masking or tokenization, controlling access permissions, etc.), then during the data analysis the system can detect if one of the datasets does not have the appropriate security measures implemented to protect the sensitive information. In particular, the system can scan and identify whether there are similar existing datasets with the appropriate security measures and determine that those appropriate security measures are in place. Alternatively, if a dataset exists with the appropriate security measures that is similar, the administrator may decide that those datasets should be merged or the dataset without the appropriate security measures should be deleted. Advantageously, identification by the system of datasets that do not include the appropriate security measures can help an administrator protect data and comply with various rules and regulations.

In some embodiments, where there is structured data, the system initially looks at the columns to determine if the columns are the same or not. Then various profile metrics (e.g., standard deviation, minimum values, maximum values, top ten grouping of values, lowest ten grouping of values, etc.) are reviewed to identify similarities. Then, data classification that categorizes each structured column into a particular category may be used to categorize the data. For instance, if the category of two datasets is the same, then this increases the probability that these datasets are similar. Finally, machine learning models may be utilize to increase a confidence level that the datasets are similar, duplicative, or otherwise redundant. Eventually, a probability percentage is generated that indicates how likely the datasets are similar. The administrator then has the option on what to do with the data (e.g., merge the datasets, delete a dataset, move a dataset to cold storage, etc.).

In some embodiments, the data analysis is a stepwise progression through various processes before the similarity determination is made and the probability/similarity percentage or score is generated. Once the percentage is generated, the percentage is compared to a similarity threshold, and if the probability/similarity percentage or score passes the similarity threshold then an electronic communication is provided to the administrator with a report and/or a recommendation on how to treat the substantially similar datasets. The administrator may also be given the option to perform a deeper review of the two datasets that are determined to be substantially similar. The electronic communication can be any electronic communication including a push notification, an email notification, a text message, an alert that displays on a home screen, etc. The electronic communication may be sent, for example, daily, weekly, monthly, quarterly, etc. In some embodiments, in between the electronic communications, an administrator may be able to log in to access a report dashboard indicating similar documents that have been identified recently.

As mentioned above, the similarity analysis may be applied to various documents, files (e.g., json files, .csv files, etc.), folders, tables, etc. In some embodiments, the datasets may not necessarily be the same file type, or may be stored to different types of tables, documents, folders, etc. Thus, comparisons can be made among different types of datasets and data In some embodiments or implementations, this process may be a dynamic process that occurs in real time when a user attempts to save a file, table, document, etc. This would be a proactive process, where the user that attempts to save a document may be alerted if an existing dataset that is substantially similar is identified prior to saving the file. For example, the system may use the processes described above to identify a subset of the file, table, document, etc. that a user is attempting to save, and may alert the user in order to help the user decide if a duplicate file is necessary or if the files should be merged.

Figure 7:
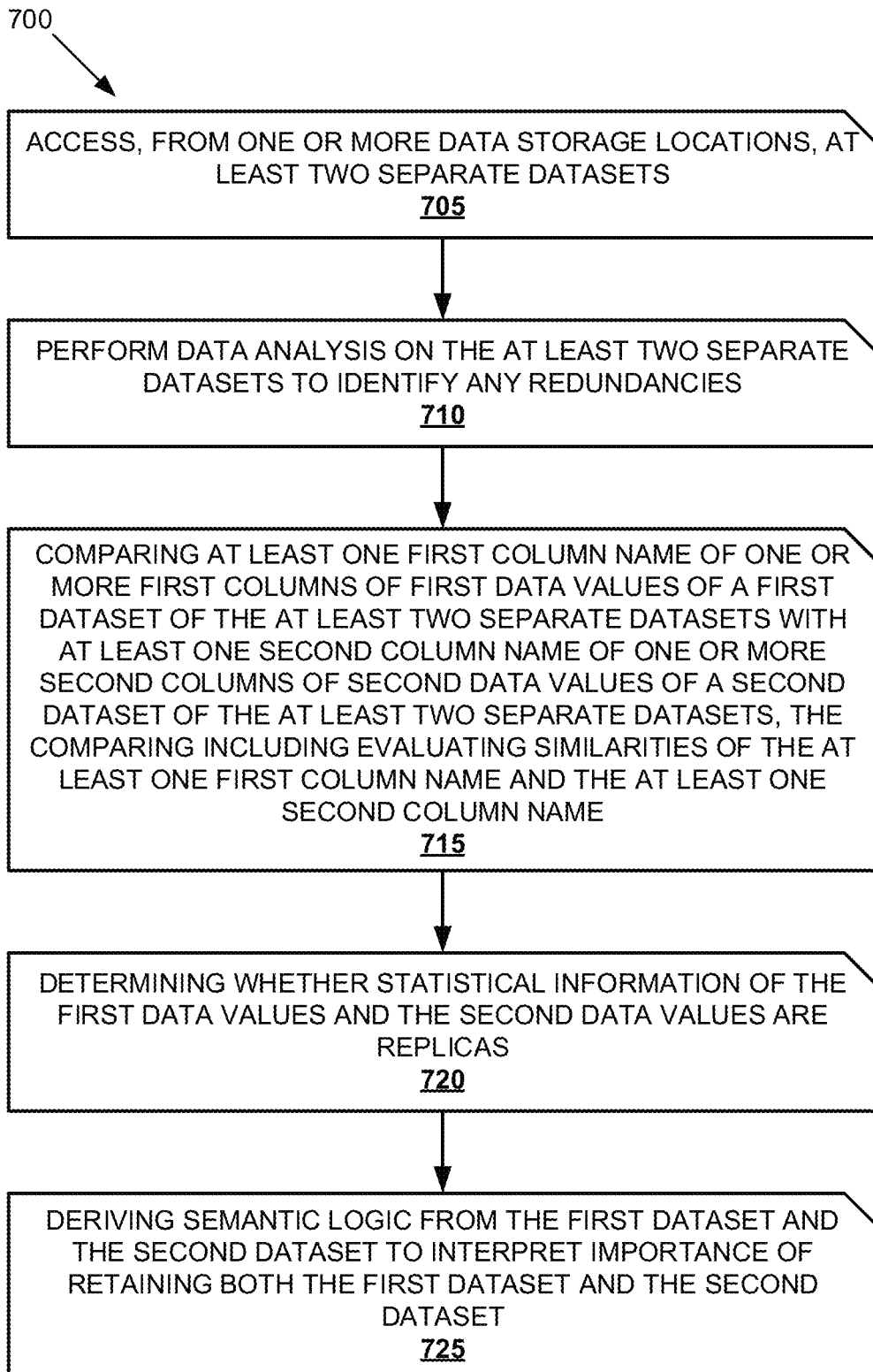
FIG. 7 depicts a block diagram of an example method for accessing datasets and performing data analysis thereon, in accordance with an embodiment of the present invention.

FIG. 7 depicts a block diagram of an example method 700 for accessing datasets and performing data analysis thereon, in accordance with an embodiment of the present invention. At block 705, the system accesses, from one or more data storage locations, at least two separate datasets. At block 710, perform data analysis on the at least two separate datasets to identify any redundancies, where the data analysis includes, as represented by block 715, comparing at least one first column name of one or more first columns of first data values of a first dataset of the at least two separate datasets with at least one second column name of one or more second columns of second data values of a second dataset of the at least two separate datasets, the comparing including evaluating similarities of the at least one first column name and the at least one second column name. The data analysis also includes, as represented by block 720, determining whether statistical information of the first data values and the second data values are replicas. Further, at block 725, the data analysis includes deriving semantic logic from the first dataset and the second dataset to interpret importance of retaining both the first dataset and the second dataset.

In some embodiments, the method 700 further includes transmitting, to a user device, one or more control signals to display, via a user interface of the user device, a prompt indicating one or more redundancies have been identified from the first dataset and the second dataset. Further, one or more inputs may be received from the user device, where the one or more inputs indicate that a user desires for one or more datasets of the at least two separate datasets to be consolidated. Based on the one or more inputs, the one or more datasets of the at least two separate datasets are consolidated thereby saving space at the one or more data storage locations.

In some embodiments, the consolidation further includes merging the one or more datasets. In some embodiments, the consolidation further includes deleting the one or more datasets. In some embodiments, the data analysis includes identifying a percentage of similarity between the first dataset and the second dataset, and the prompt indicates the percentage of similarity. In some embodiments, the data analysis includes calculating a checksum of the at least two separate datasets to determine how the at least two separate datasets have changed over time, and wherein the prompt indicates one or more changes identified from determining how the at least two separate datasets have changed over time. In some embodiments, the data analysis includes ascertaining a deviation amount of the first dataset and the second dataset.

In some embodiments, the data analysis includes ascertaining a first maximum value of the first data values, first mean value of the first data values, and a first range of values of the first data values, a second maximum value of the second data values, a second mean value of the second data values, and a second range of values of the second data values. Further, the first maximum value may be compared to the to the second maximum value, the first mean value to the second mean value, and the first range to the second range. Based on the comparing, the system determines whether the first dataset and the second dataset are identical. In some embodiments, the data analysis includes determining whether one dataset of the first dataset and the second dataset is a subset of another dataset of the first dataset and the second dataset.

In some embodiments, deriving the semantic logic incorporates natural language processing to interpret meaning of words included in the at least two separate datasets, and based thereon determine whether the meaning of the words is the same.

In some example embodiments, in order for the data to be analyzed, a data cleaning process may be performed on procured data, where the data cleaning processing includes scouring and auditing data values of the procured data in accordance with predefined rules to correct errors that would render the data values incongruent with the data analysis, the data cleaning facilitating improving accuracy of the data values to be analyzed during the data analysis.

Figure 8:
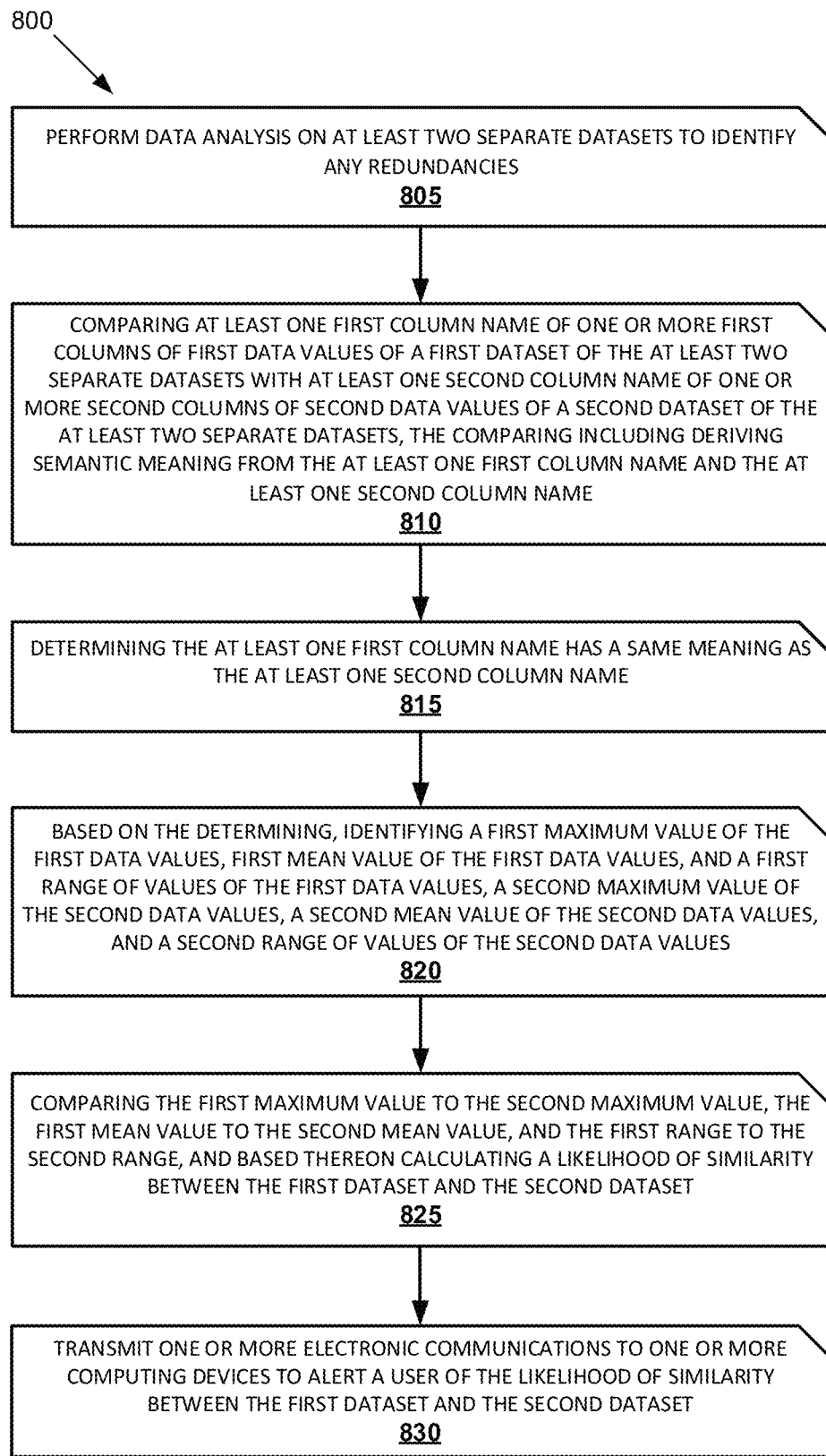
FIG. 8 depicts a block diagram of an example method for data redundancy detection and consolidation, in accordance with an embodiment of the present invention.

FIG. 8 depicts a block diagram of an example method 800 for data redundancy detection and consolidation, in accordance with an embodiment of the present invention. At block 805, data analysis is performed on at least two separate datasets to identify any redundancies. The data analysis includes, as represented by block 810, comparing at least one first column name of one or more first columns of first data values of a first dataset of the at least two separate datasets with at least one second column name of one or more second columns of second data values of a second dataset of the at least two separate datasets, the comparing including deriving semantic meaning from the at least one first column name and the at least one second column name. At block 815, the data analysis includes determining the at least one first column name has a same meaning as the at least one second column name. At block 820, based on the determining, the data analysis also includes identifying a first maximum value of the first data values, first mean value of the first data values, and a first range of values of the first data values, a second maximum value of the second data values, a second mean value of the second data values, and a second range of values of the second data values. Further, at block 825, the data analysis includes comparing the first maximum value to the second maximum value, the first mean value to the second mean value, and the first range to the second range, and based thereon calculating a likelihood of similarity between the first dataset and the second dataset.

At block 830, the system transmits one or more electronic communications to one or more computing devices to alert a user of the likelihood of similarity between the first dataset and the second dataset. The transmitting may be based on the likelihood of similarity surpassing a predefined threshold similarity value that indicates the first dataset and the second dataset are sufficiently similar to be redundant.

In some embodiments, the method 800 also includes receiving, from the computing device, one or more inputs indicating the user desires for one or more datasets of the at least two separate datasets to be consolidated. Further, based on the one or more inputs, the one or more datasets of the at least two separate datasets is consolidated, thereby saving space at the one or more data storage locations. In addition, the consolidating includes determining whether one dataset of the one or more datasets comprises personally identifiable information that has not been tokenized, and based thereon deleting the one dataset with the non-tokenized personally identifiable information.

Figure 9:
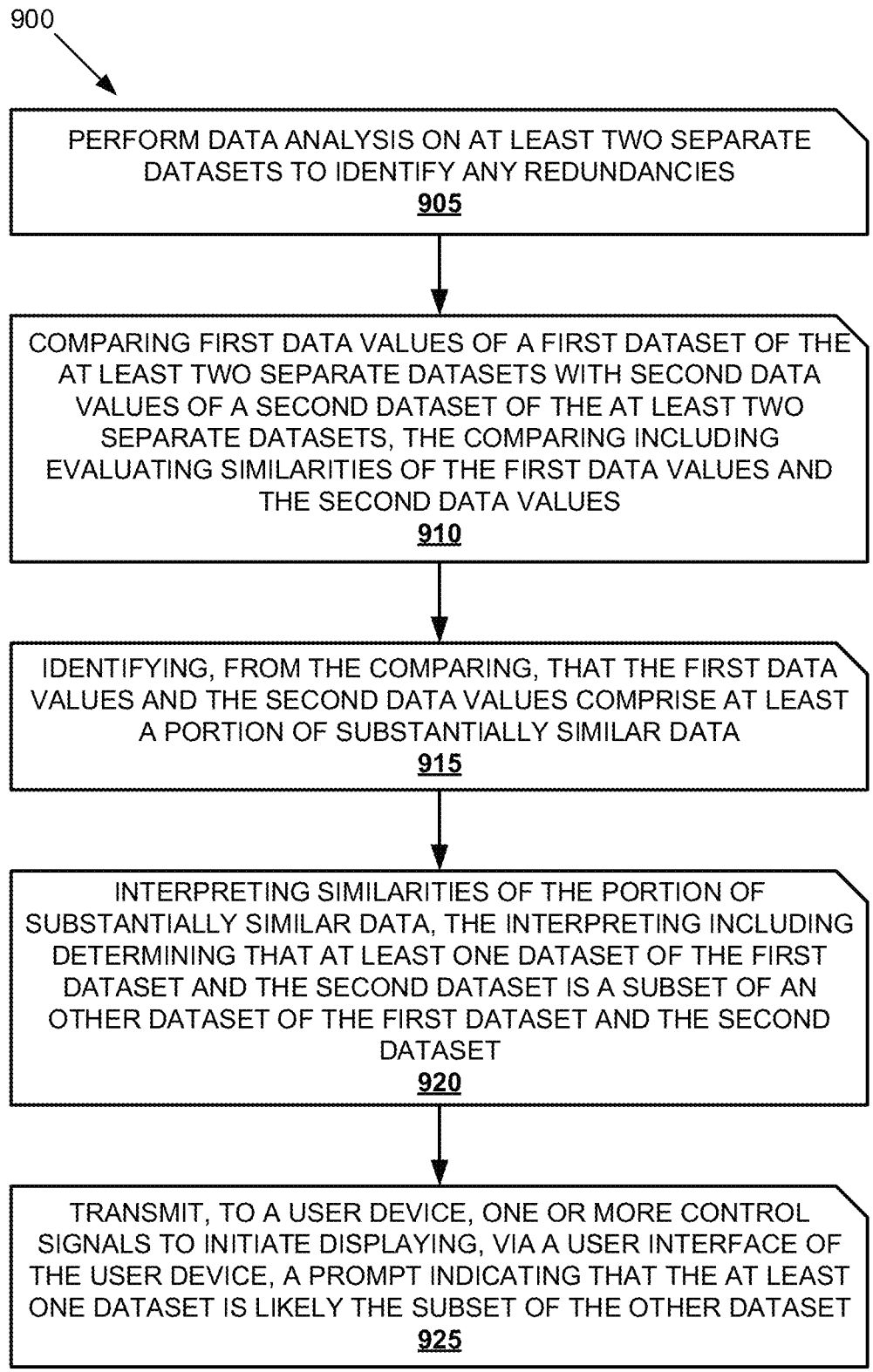
FIG. 9 depicts a block diagram of an example method for database management, in accordance with an embodiment of the present invention.

FIG. 9 depicts a block diagram of an example method 900 for database management, in accordance with an embodiment of the present invention. At block 905, the system performs data analysis on at least two separate datasets to identify any redundancies. The data analysis includes, as represented by block 910, comparing first data values of a first dataset of the at least two separate datasets with second data values of a second dataset of the at least two separate datasets, the comparing including evaluating similarities of the first data values and the second data values. In some embodiments, the comparing includes incorporating natural language processing to interpret meaning of words included in the at least two separate datasets, and based thereon determine whether the meaning of the words is the same.

At block 915, the data analysis includes identifying, from the comparing, that the first data values and the second data values comprise at least a portion of substantially similar data. At block 920, the data analysis includes interpreting similarities of the portion of substantially similar data, the interpreting including determining that at least one dataset of the first dataset and the second dataset is a subset of an other dataset of the first dataset and the second dataset.

In some embodiments, wherein the data analysis further includes identifying a percentage of similarity between the at least one dataset and the other dataset, and the prompt indicates the percentage of similarity. In some embodiments, the data analysis further includes calculating a checksum of the at least two separate datasets to determine how the at least two separate datasets have changed over time, and wherein the prompt further indicates one or more changes identified from determining how the at least two separate datasets have changed over time. In addition, in some embodiments, the prompt further indicates which of the one dataset and the other dataset has been most recently modified. In some embodiments, the data analysis comprises determining whether the at least one dataset comprises masked or tokenized data other comprises personally identifiable information that has not been tokenized or masked in the other dataset, and based thereon including in the prompt to be displayed a control input for tokenizing or masking the personally identifiable information of the other dataset.

At block 925, the system transmits, to a user device, one or more control signals to initiate displaying, via a user interface of the user device, a prompt indicating that the at least one dataset is likely the subset of the other dataset. In some embodiments, the data analysis includes identifying a percentage of similarity between the at least one dataset and the other dataset and the transmitting is based on comparing the percentage of similarity to a predetermined threshold and the percentage of similarity being at least equal to the predetermined threshold.

In some embodiments, the system also receives, from the user device, one or more inputs indicating a user desires for the at least one dataset is to be consolidated with the other dataset, and based on the one or more inputs, the at least one dataset is consolidated with the other dataset thereby saving space at one or more data storage locations that store the at least two separate datasets. In some embodiments, the consolidating includes deleting the at least one dataset.

In some embodiments, the method 900 includes ascertaining a first maximum value of the first data values, a first minimum value of the first data values, a first mean value of the first data values, and a first range of values of the first data values, a first standard deviation of the first data values, a second maximum value of the second data values, a second minimum value of the second data values, a second mean value of the second data values, a second range of values of the second data values, and a second standard deviation of the second data values. Further, in some embodiments, the method 900 includes relating the first maximum value to the second maximum value, the first minimum value to the second minimum value, the first mean value to the second mean value, the first range to the second range, and the first standard deviation to the second standard deviation.

Figure 10:
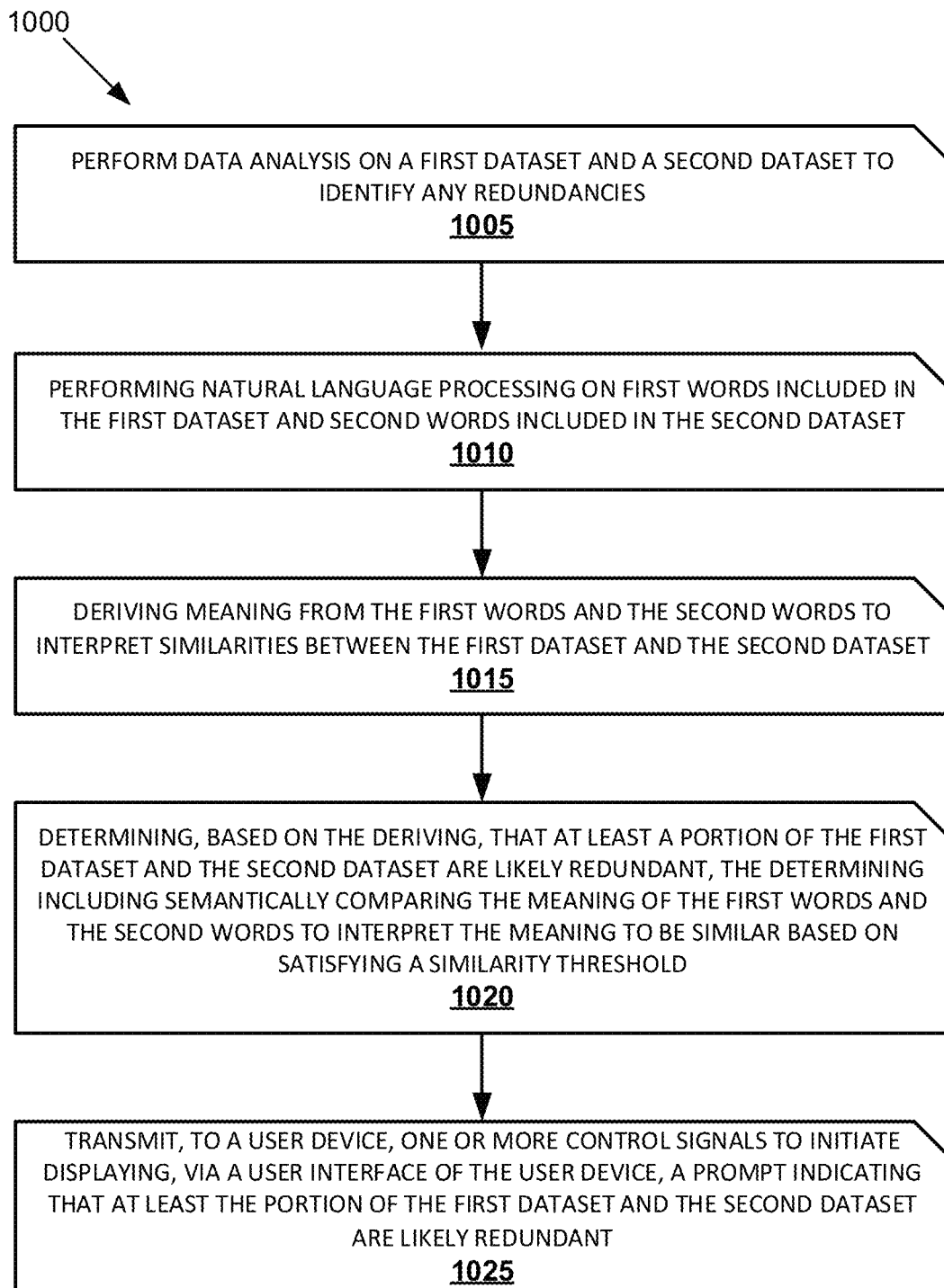
FIG. 10 depicts a block diagram of an example method to facilitate data redundancy detection, in accordance with an embodiment of the present invention.

FIG. 10 depicts a block diagram of an example method 1000 to facilitate data redundancy detection, in accordance with an embodiment of the present invention. At block 1005, the system performs data analysis on a first dataset and a second dataset to identify any redundancies. The data analysis includes, at block 1010, performing natural language processing on first words included in the first dataset and second words included in the second dataset, and at block 1015 deriving meaning from the first words and the second words to interpret similarities between the first dataset and the second dataset. Further, the data analysis includes, at block 1020, determining, based on the deriving, that at least a portion of the first dataset and the second dataset are likely redundant, the determining including semantically comparing the meaning of the first words and the second words to interpret the meaning to be similar based on satisfying a similarity threshold. At block 1025, the system transmits, to a user device, one or more control signals to initiate displaying, via a user interface of the user device, a prompt indicating that at least the portion of the first dataset and the second dataset are likely redundant.

In some embodiments, the method 1000 further includes receiving, from the user device, one or more inputs indicating the user desires for a dataset of the first dataset and the second dataset to be consolidated. In some embodiments, based on the one or more inputs, the dataset is consolidated thereby saving space at the one or more data storage locations. Further, the consolidating may include determining that either the first dataset or the second dataset comprises sensitive information that includes a security restriction, and based thereon applying the security restriction to a consolidated dataset that is produced by the consolidating.

Figure 11:
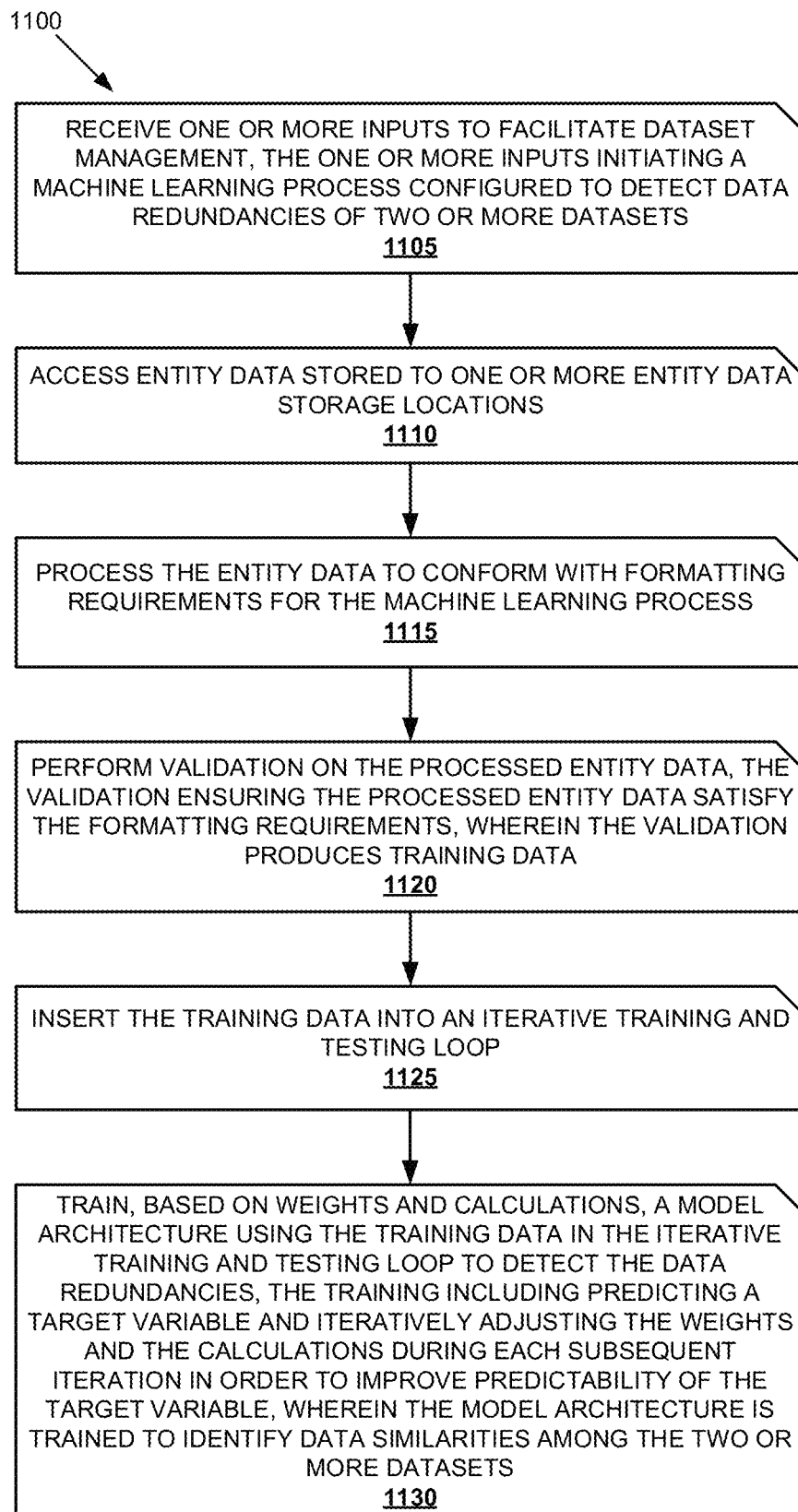
FIG. 11 depicts a block diagram of an example method for database management of datasets, in accordance with an embodiment of the present invention.

FIG. 11 depicts a block diagram of an example method 1100 for database management of datasets, in accordance with an embodiment of the present invention. At block 1105, the system receives one or more inputs to facilitate dataset management, the one or more inputs initiating a machine learning process configured to detect data redundancies of two or more datasets. Further, at block 1110, the system accesses entity data stored to one or more entity data storage locations. At block 1115, the system processes the entity data to conform with formatting requirements for the machine learning process, and at block 1120, validation is performed on the processed entity data, the validation ensuring the processed entity data satisfy the formatting requirements, wherein the validation produces training data. At block 1125, the training data is inserted into an iterative training and testing loop, and at block 1130, a model architecture is trained, based on weights and calculations, using the training data in the iterative training and testing loop to detect the data redundancies, the training including predicting a target variable and iteratively adjusting the weights and the calculations during each subsequent iteration in order to improve predictability of the target variable, wherein the model architecture is trained to identify data similarities among the two or more datasets.

In some embodiments, the model architecture is trained to perform natural language processing on column names of the two or more datasets, comparing the column names of the two or more datasets, and determine a likelihood of similarity of the column names. In some embodiments, the model architecture is trained to ascertain and compare maximum data values, mean values, a range of values, minimum values, and standard deviations of data from the two or more datasets. Further, in some embodiments, the model architecture is trained to identify a percentage of similarity between at least one dataset and another dataset.

In various embodiments, the model architecture is trained to identify sensitive information included in the two or more datasets and determine, based on one or more rules, that a security restriction needs to be added to the sensitive information, where the security restriction can include tokenization or masking. The sensitive information can include personally identifiable information.

In some embodiments, the model architecture is trained to determine from two or more datasets whether one dataset of the two or more datasets is a subset of another dataset of the two or more datasets based on a degree of similarity of a portion of data. In various embodiments, the model architecture is trained to evaluate changes of the two or more datasets over time to identify which of the two or more datasets may include more recent data. In some embodiments, the model architecture is trained to perform natural language processing on words included in the two or more datasets and derive similarities in meaning from the words in order to determine whether the two or more datasets are redundant.

Figure 12:
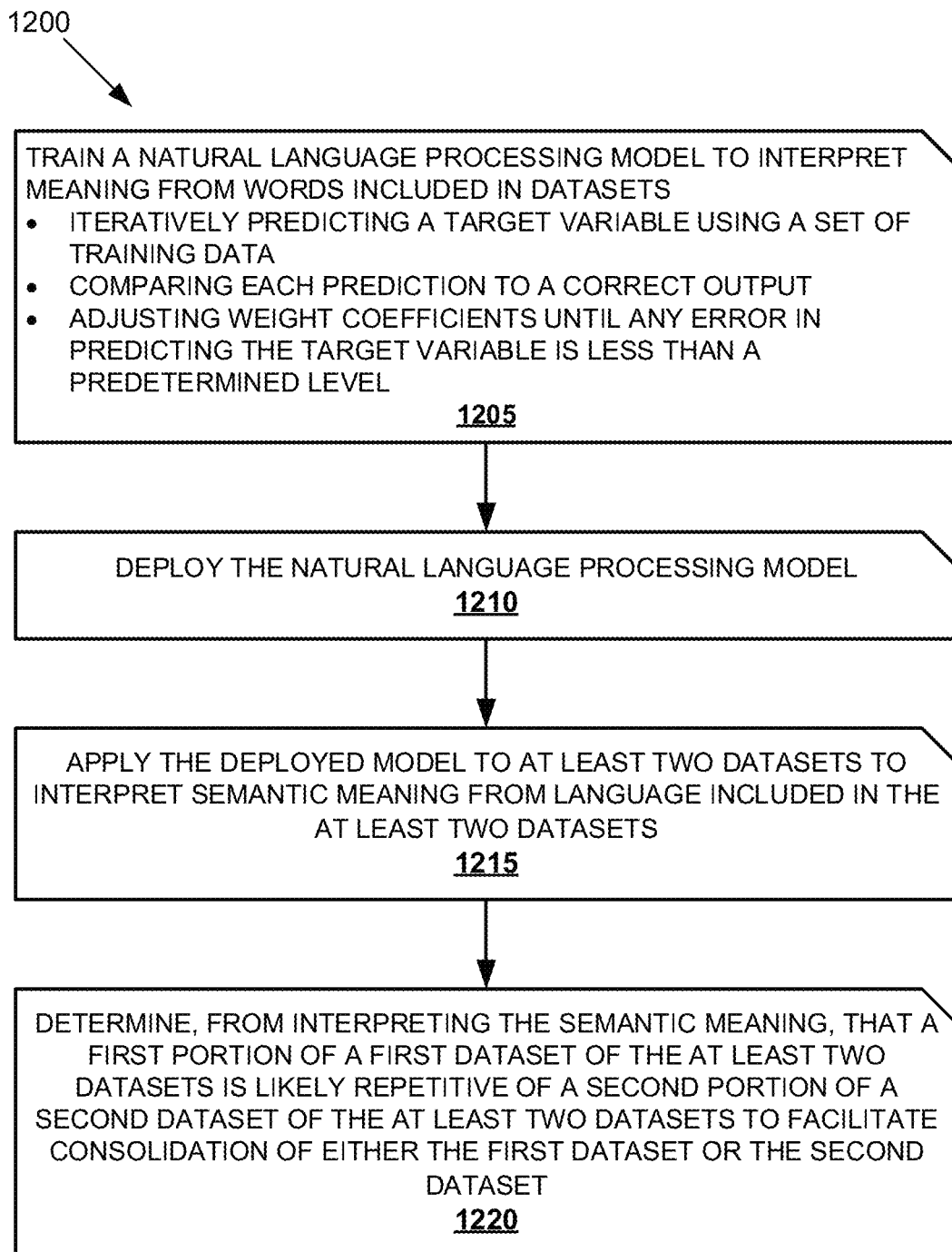
FIG. 12 depicts a block diagram of an example method facilitating dataset redundancy detection, in accordance with an embodiment of the present invention.

FIG. 12 depicts a block diagram of an example method 1200 facilitating dataset redundancy detection, in accordance with an embodiment of the present invention. At block 1205, the system trains a natural language processing model to interpret meaning from words included in datasets. The training can include iteratively predicting a target variable using a set of training data, comparing each prediction to a correct output, and adjusting weight coefficients until any error in predicting the target variable is less than a predetermined level. At block 1210, the natural language processing model is deployed, and at block 1215 the deployed model is applied to at least two datasets to interpret semantic meaning from language included in the at least two datasets. At block 1220, the system determines, from interpreting the semantic meaning, that a first portion of a first dataset of the at least two datasets is likely repetitive of a second portion of a second dataset of the at least two datasets to facilitate consolidation of either the first dataset or the second dataset.

In some embodiments, the method 1200 further includes applying data classification to the at least two datasets, wherein the data classification categorizes each structured column of structured data according to respective categories and based thereon the deployed model is applied to the at least two datasets to provide greater surety that the first portion is likely repetitive of the second portion.

Figure 13:
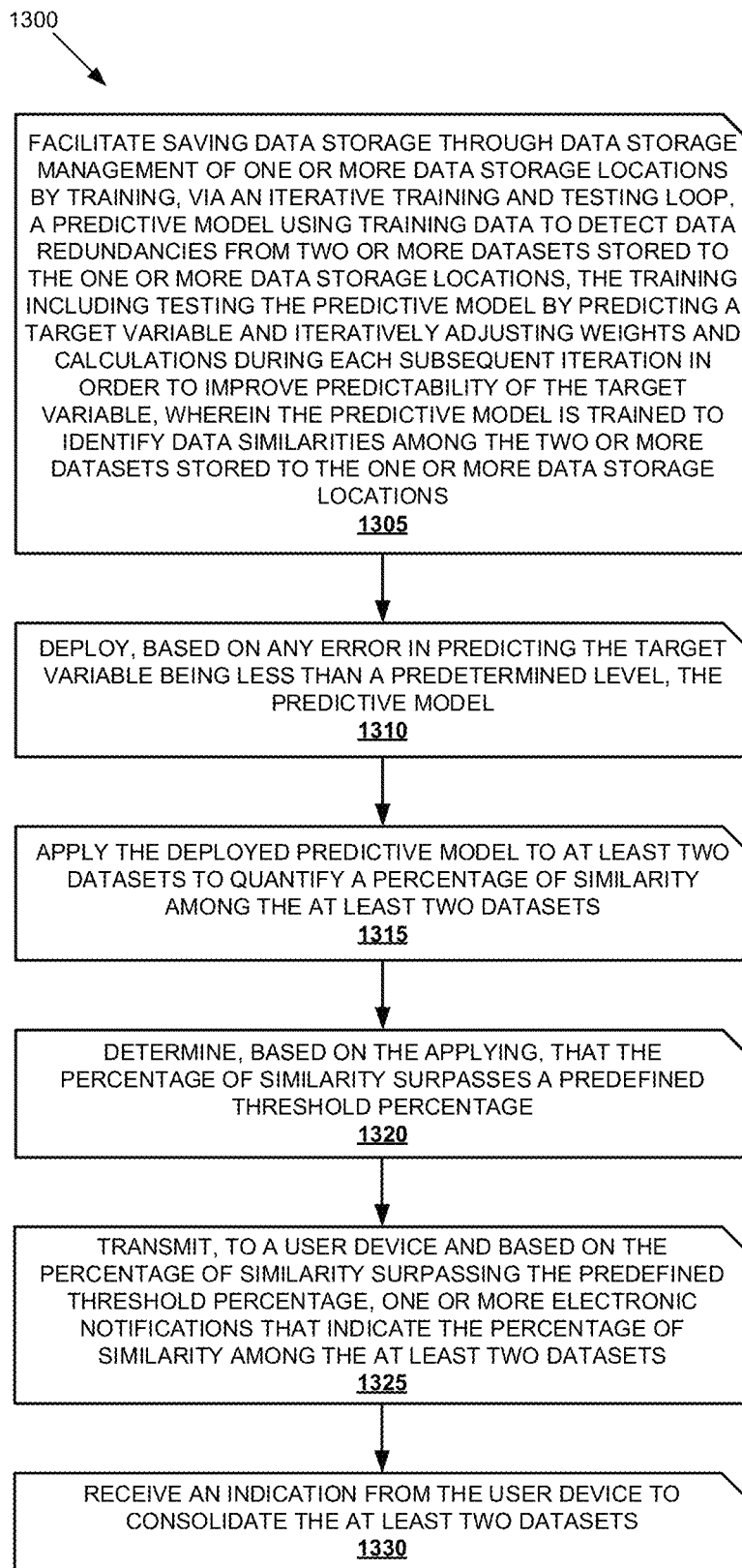
FIG. 13 depicts a block diagram of an example method for dataset consolidation, in accordance with an embodiment of the present invention.

FIG. 13 depicts a block diagram of an example method 1300 for dataset consolidation, in accordance with an embodiment of the present invention. At block 1305, the system facilitates saving data storage through data storage management of one or more data storage locations by training, via an iterative training and testing loop, a predictive model using training data to detect data redundancies from two or more datasets stored to the one or more data storage locations, the training including testing the predictive model by predicting a target variable and iteratively adjusting weights and calculations during each subsequent iteration in order to improve predictability of the target variable, wherein the model architecture is trained to identify data similarities among the two or more datasets stored to the one or more data storage locations. At block 1310, the system deploys, based on any error in predicting the target variable being less than a predetermined level, the predictive model. At block 1315, the system applies the deployed predictive model to at least two datasets to quantify a percentage of similarity among the at least two datasets. In some embodiments, the applying the deployed predictive model to the at least two datasets is based on receiving an indication indicating that the deployed predictive model is to be applied to the at least two datasets. In some embodiments, the percentage of similarity is quantified based on interpreting meaning of words included in the at least two datasets.

Further, at block 1320, the system determines, based on the applying, that the percentage of similarity surpasses a predefined threshold percentage. At block 1325, the system transmits, to a user device and based on the percentage of similarity surpassing the predefined threshold percentage, one or more electronic notifications that indicate the percentage of similarity among the at least two datasets. Further, at block 1330, the system receives an indication from the user device to consolidate the at least two datasets. In some embodiments, wherein the consolidating the at least two datasets includes deleting a dataset of the at least two datasets from the one or more data storage locations. In other embodiments, the consolidating the at least two datasets includes merging one dataset of the at least two datasets with another dataset of the at least two datasets.

Figure 14:
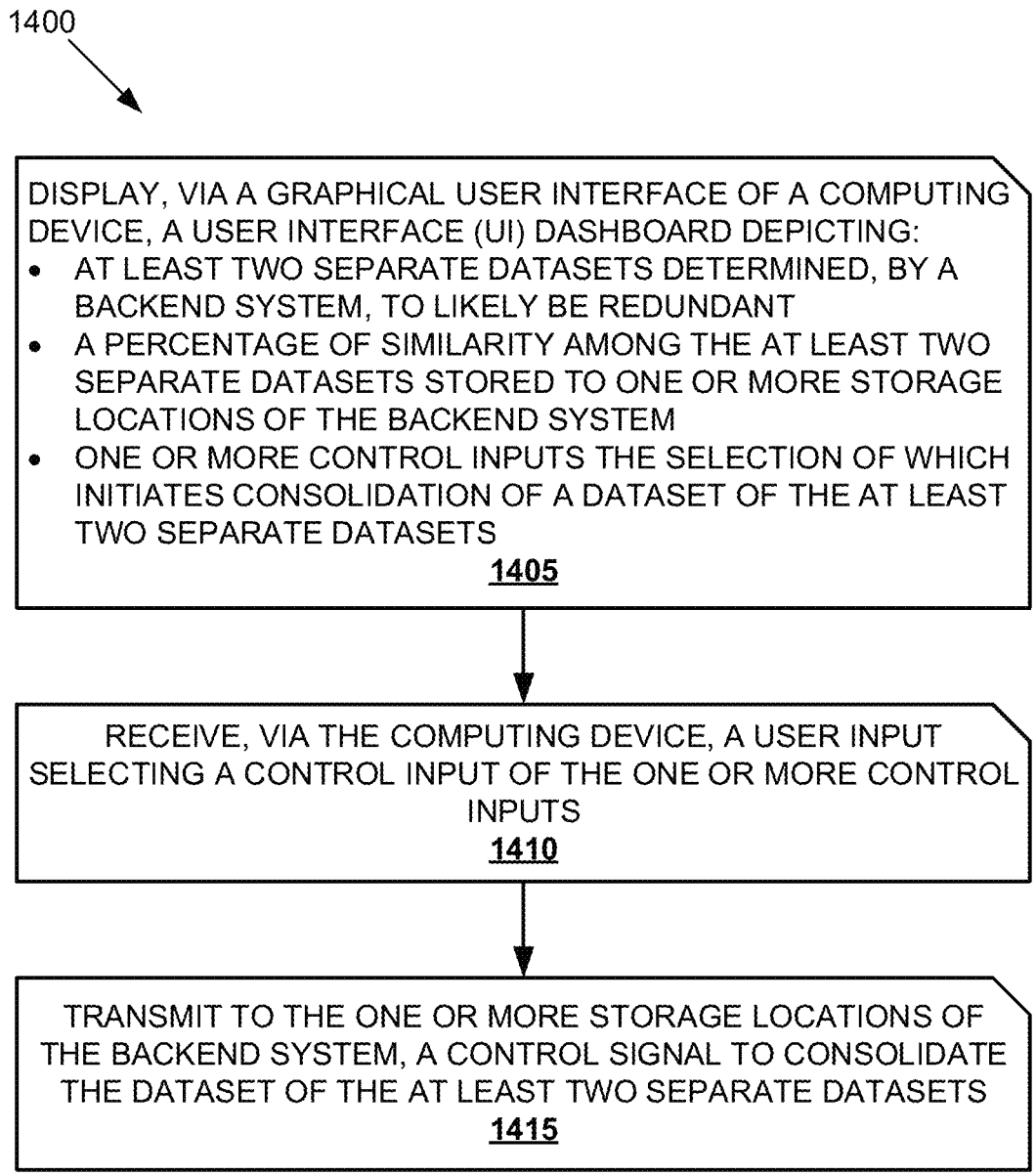
FIG. 14 depicts a block diagram of an example method facilitating data redundancy consolidation, in accordance with an embodiment of the present invention.

FIG. 14 depicts a block diagram of an example method 1400 facilitating data redundancy consolidation, in accordance with an embodiment of the present invention. At block 1405, the system displays, via a graphical user interface of a computing device, a user interface (UI) dashboard depicting (i) at least two separate datasets determined, by a backend system, to likely be redundant, (ii) a percentage of similarity among the at least two separate datasets stored to one or more storage locations of the backend system, and (iii) one or more control inputs the selection of which initiates consolidation of a dataset of the at least two separate datasets. In some embodiments, the two or more datasets are determined to likely be redundant based on a prediction performed by a predictive model. In some embodiments, the UI dashboard further depicts one or more prompts indicating that the dataset of the at least two separate datasets is likely a subset of another dataset of the at least two separate datasets.

In some embodiments, the UI dashboard further depicts one or more prompts indicating that one dataset of the at least two separate datasets likely includes sensitive data requiring security measures to protect the sensitive data, and based thereon display, via the graphical user interface, a security control input configured to apply a security measure, such as masking or tokenization, to the sensitive data. In some embodiments, the sensitive data includes personally identifiable customer information. In some embodiments, the UI dashboard further depicts a detailed control input for accessing data details about the at least two separate datasets, wherein selection of the detailed control input facilitates displaying data content of each of the at least two separate datasets. In some embodiments, the UI dashboard further depicts a detailed control input for accessing data details about the at least two separate datasets, wherein depicting the detailed control input is restricted to user accounts of credentialed users that are permitted to access sensitive data. In some embodiments, the UI dashboard further depicts a scanning control input to initiate a review of the at least two separate datasets, wherein the at least two separate datasets are depicted based on a user selecting the scanning control input.

At block 1410, the system receives, via the computing device, a user input selecting a control input of the one or more control inputs. At block 1415, the system transmits to the one or more storage locations of the backend system, a control signal to consolidate the dataset of the at least two separate datasets. In some embodiments, the consolidating the dataset of the at least two separate datasets includes merging the dataset with another dataset of the at least two separate datasets, whereas in other embodiments, the consolidating the dataset of the at least two separate datasets includes deleting the dataset from the one or more storage locations.

In some embodiments, the system further displays, via the graphical user interface, an authentication page for receiving authentication information of a user. Further, the system receives, via the authentication page, the authentication information of the user, and the authentication information of the user is verified. Based on the authentication information being verified, access to the UI dashboard is provided. In some embodiments, the system receives, via selection of a scanning control input, an indication to initiate comparing data of at least two separate datasets, and based on receiving the indication, transmit an initiation signal to the backend system to perform a comparison of the at least two separate datasets.

Figure 15:
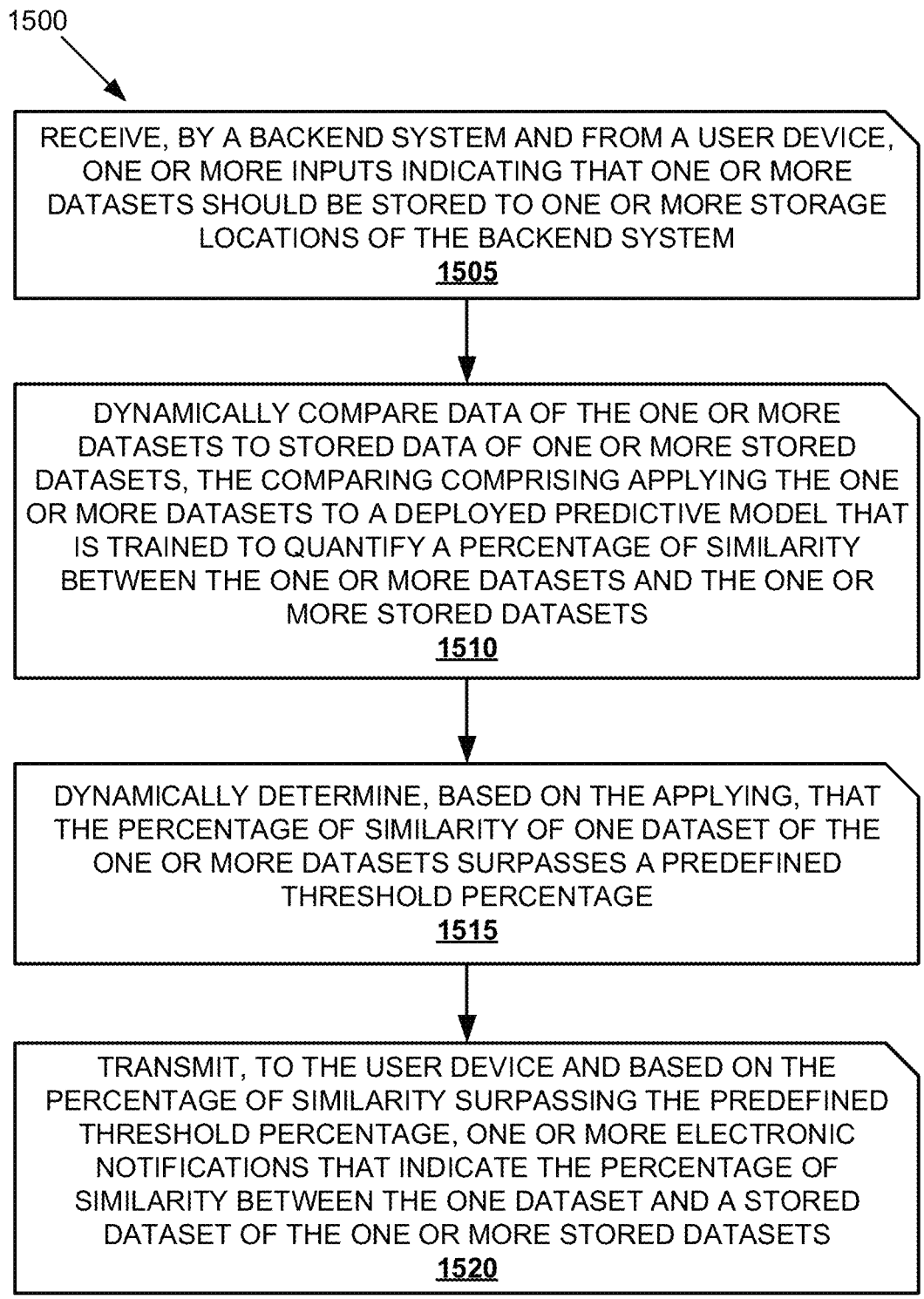
FIG. 15 depicts a block diagram of an example method for proactive database management, in accordance with an embodiment of the present invention.

FIG. 15 depicts a block diagram of an example method 1500 for proactive database management, in accordance with an embodiment of the present invention. At block 1505, a backend system receives, from a user device, one or more inputs indicating that one or more datasets should be stored to one or more storage locations of the backend system. At block 1510, data of the one or more datasets is dynamically compared to stored data of one or more stored datasets, where the comparing includes applying the one or more datasets to a deployed predictive model that is trained to quantify a percentage of similarity between the one or more datasets and the one or more stored datasets. In some embodiments, the deployed predictive model compares statistical information of each column of data of the one dataset and the stored dataset in order to quantify the percentage of similarity, the statistical information being selected from the group consisting of a maximum value, a minimum value, a mean value, a range of data values, and a standard deviation of data values. In some embodiments, the deployed predictive model compares semantic meaning of words included in the one or more datasets to words of the stored data of the one or more stored datasets.

In some embodiments, the deployed predictive model compares column names of columns of the one or more datasets to stored data column names of the one or more stored datasets. In some embodiments, comparing the data of the one or more datasets to the stored data of the one or more stored datasets includes determining whether the data of the one or more datasets includes sensitive information and based thereon include in the one or more electronic notifications a recommendation to add a security restriction to the sensitive information. In some embodiments, the security restriction comprises tokenization of the sensitive information, whereas in other embodiments the security restriction comprises masking of the sensitive information. In some embodiments, comparing the data includes determining whether the one or more datasets include additional data in addition to the stored data and based thereon the one or more electronic notifications further indicate that the stored data is likely a subset of the data of the one or more datasets. In various embodiments, comparing the data includes determining whether the stored data includes additional data in addition to the data of the one or more datasets and based thereon the one or more electronic notifications further indicate the data of the one or more datasets is likely a subset of the stored data of the one or more stored datasets.

At block 1515, based on the applying, the backend system dynamically determines that the percentage of one dataset of the one or more datasets similarity surpasses a predefined threshold percentage. At block 1520, the backend system transmits to the user device, and based on the percentage of similarity surpassing the predefined threshold percentage, one or more electronic notifications that indicate the percentage of similarity between the one dataset and a stored dataset of the one or more stored datasets.

In some embodiments, the backend system also receives, from the user device, a request to merge the one dataset and the stored dataset of the one or more stored datasets. In some embodiments, the backend system receives, from the user device, a request to replace the stored dataset with the one dataset.

Figure 16:
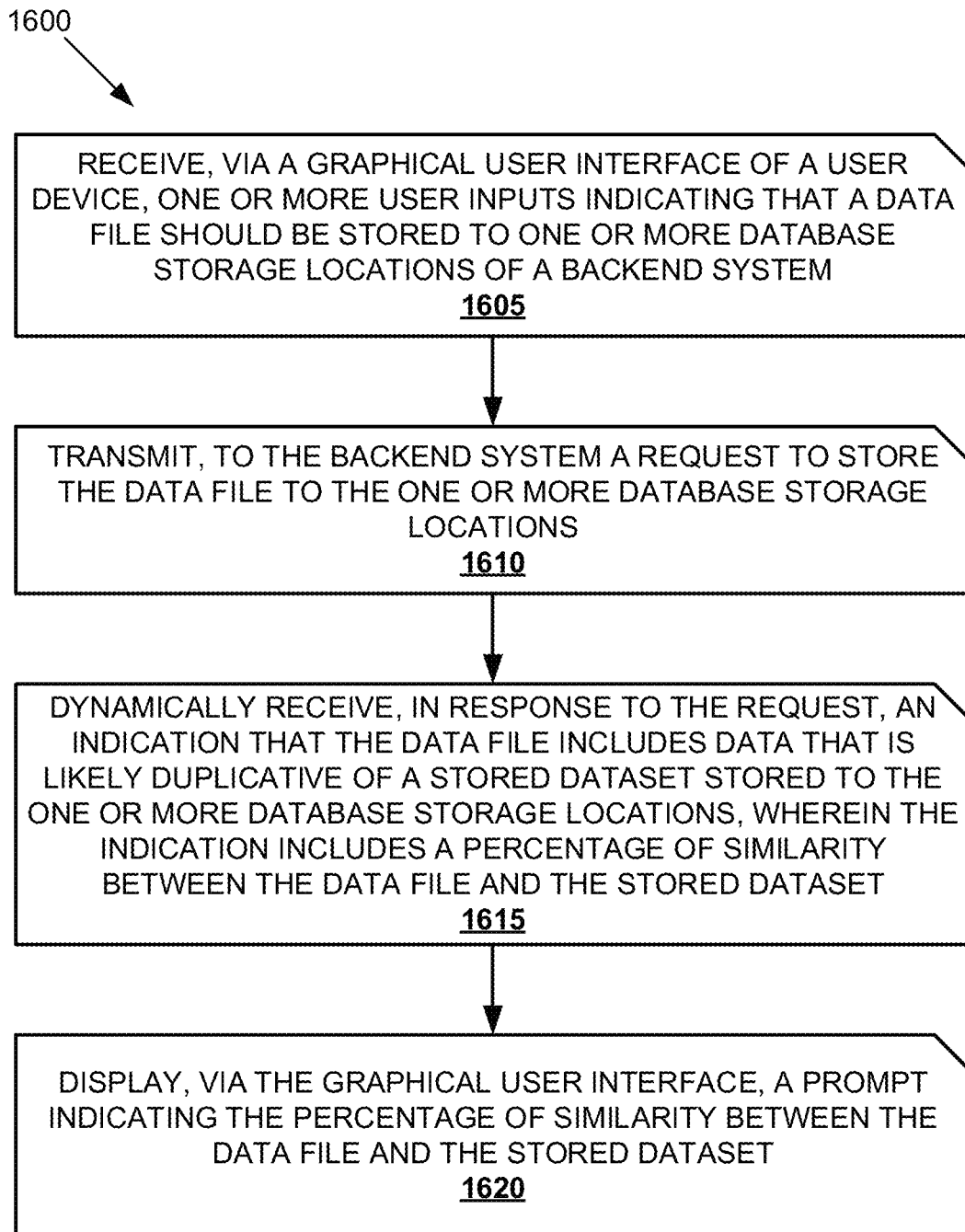
FIG. 16 depicts a block diagram of an example method facilitating database management, in accordance with an embodiment of the present invention.

FIG. 16 depicts a block diagram of an example method 1600 facilitating database management, in accordance with an embodiment of the present invention. At block 1605, the system receives, via a graphical user interface of a user device, one or more user inputs indicating that a data file should be stored to one or more database storage locations of a backend system. At block 1610, the system transmits, to the backend system a request to store the data file to the one or more database storage locations. At block 1615, the system dynamically receives, in response to the request, an indication that the data file includes data that is likely duplicative of a stored dataset stored to the one or more database storage locations, wherein the indication includes a percentage of similarity between the data file and the stored dataset. In some embodiments, the indication is received based on the backend system applying the data file to a deployed prediction model that compares content of the data file to content of the stored dataset. At block 1620, a prompt is displayed, via the graphical user interface, indicating the percentage of similarity between the data file and the stored dataset.

In some embodiments, the system dynamically receives a recommendation to apply a security restriction to sensitive data of the data file and based thereon include the recommendation in the prompt. In some embodiments, the system dynamically receives additional information indicating whether the data file is likely a subset of the stored dataset and based thereon include the additional information in the prompt. In some embodiments, the system dynamically receives additional information indicating whether the stored dataset is likely a subset of the data file and based thereon include the additional information in the prompt.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computing system for proactive database management, comprising:
    at least one processor;
    a communication interface communicatively coupled to the at least one processor; and
    a memory device storing executable code that, when executed, causes the at least one processor to:
        receive, by a backend system and from a user device, one or more inputs indicating that one or more datasets should be stored to one or more storage locations of the backend system;
        dynamically compare metadata and data of the one or more datasets to stored data and associated metadata of one or more stored datasets, the comparing comprising applying the one or more datasets to a deployed predictive model that is trained to quantify a percentage of similarity between the one or more datasets and the one or more stored datasets, the comparing including:
            profiling the one dataset of the one or more datasets to assign metrics to the one dataset of the one or more datasets; and
            ascertaining how the one dataset of the one or more datasets and the stored data of the one or more stored datasets have changed over time in order to determine whether the one dataset of the one or more datasets or the stored data of the one or more stored datasets is more recently modified;
        dynamically determine, based on the applying, that the percentage of similarity of one dataset of the one or more datasets surpasses a predefined threshold percentage; and
        transmit, to the user device and based on the percentage of similarity surpassing the predefined threshold percentage, one or more electronic notifications that indicate;
            the percentage of similarity between the one dataset and a stored dataset of the one or more stored datasets; and
            whether the one dataset or the stored dataset was most recently modified.

2. The computing system of claim 1, wherein the deployed predictive model compares, as part of the profiling, statistical information of each column of data of the one dataset and the stored dataset in order to quantify the percentage of similarity, the statistical information being selected from the group consisting of a maximum value, a minimum value, a mean value, a range of data values, and a standard deviation of data values.

3. The computing system of claim 1, wherein the deployed predictive model compares semantic meaning of words included in the one or more datasets to words of the stored data of the one or more stored datasets.

4. The computing system of claim 1, wherein the deployed predictive model compares column names of columns of the one or more datasets to stored data column names of the one or more stored datasets.

5. The computing system of claim 1, wherein the executable code, when executed, further causes the at least one processor to receive, from the user device, a request to merge the one dataset and the stored dataset of the one or more stored datasets.

6. The computing system of claim 1, wherein the executable code, when executed, further causes the at least one processor to receive, from the user device, a request to replace the stored dataset with the one dataset.

7. The computing system of claim 1, wherein the comparing the data of the one or more datasets to the stored data of the one or more stored datasets includes determining whether the data of the one or more datasets includes sensitive information and based thereon include in the one or more electronic notifications a recommendation to add a security restriction to the sensitive information.

8. The computing system of claim 7, wherein the security restriction comprises tokenization of the sensitive information.

9. The computing system of claim 7, wherein the security restriction comprises masking of the sensitive information.

10. The computing system of claim 1, wherein the comparing the data includes determining whether the one or more datasets include additional data in addition to the stored data and based thereon the one or more electronic notifications further indicate that the stored data is likely a subset of the data of the one or more datasets.

11. The computing system of claim 1, wherein the comparing the data includes determining whether the stored data includes additional data in addition to the data of the one or more datasets and based thereon the one or more electronic notifications further indicate the data of the one or more datasets is likely a subset of the stored data of the one or more stored datasets.

12. A computing system facilitating database management, the computing system comprising:
    at least one processor;
    a communication interface communicatively coupled to the at least one processor; and
    a memory device storing executable code that, when executed, causes the at least one processor to:
        receive, via a graphical user interface of a user device, one or more user inputs indicating that a data file should be stored to one or more database storage locations of a backend system;
        transmit, to the backend system a request to store the data file to the one or more database storage locations;
        dynamically receive, in response to the request, (1) an indication that the data file includes data that is likely duplicative of a stored dataset stored to the one or more database storage locations, wherein the indication includes a percentage of similarity between metadata and the data of the data file and the stored dataset, and (2) an output indicating whether the data file or the stored dataset are more recently modified; and
        display, via the graphical user interface, a prompt indicating the percentage of similarity between the metadata and the data of the data file and the stored dataset as well as the output of whether the data file or the stored dataset are more recently modified.

13. The computing system of claim 12, wherein the executable code, when executed, further causes the at least one processor to dynamically receive a recommendation to apply a security restriction to sensitive data of the data file and based thereon include the recommendation in the prompt.

14. The computing system of claim 12, wherein the executable code, when executed, further causes the at least one processor to dynamically receive additional information indicating whether the data file is likely a subset of the stored dataset and based thereon include the additional information in the prompt.

15. The computing system of claim 12, wherein the executable code, when executed, further causes the at least one processor to dynamically receive additional information indicating whether the stored dataset is likely a subset of the data file and based thereon include the additional information in the prompt.

16. The computing system of claim 12, wherein the indication is received based on the backend system:
profiling the data file to assign metrics to the data file;
ascertaining how the data file and the stored dataset have changed over time in order to determine whether the data file or the stored dataset is more recently modified;
applying the data file to a deployed prediction model that compares content of the data file to content of the stored dataset.

17. A computer-implemented method, comprising:
receiving, by a backend system and from a user device, one or more inputs indicating that one or more datasets should be stored to one or more storage locations of the backend system;
dynamically comparing metadata and data of the one or more datasets to stored data and associated metadata of one or more stored datasets, the comparing comprising applying the one or more datasets to a deployed predictive model that is trained to quantify a percentage of similarity between the one or more datasets and the one or more stored datasets, the comparing including:
profiling the one dataset of the one or more datasets to assign metrics to the one dataset of the one or more datasets; and
ascertaining how the one dataset of the one or more datasets and the stored data of the one or more stored datasets have changed over time in order to determine whether the one dataset of the one or more datasets or the stored data of the one or more stored datasets is more recently modified;
dynamically determining, based on the applying, that the percentage of similarity of one dataset of the one or more datasets surpasses a predefined threshold percentage; and
transmitting, to the user device and based on the percentage of similarity surpassing the predefined threshold percentage, one or more electronic notifications that indicate the percentage of similarity between the one dataset and a stored dataset of the one or more stored datasets.

18. The computer-implemented method of claim 17, wherein the deployed predictive model compares statistical information of each column of data of the one dataset and the stored dataset in order to quantify the percentage of similarity, the statistical information being selected from the group consisting of a maximum value, a minimum value, a mean value, a range of data values, and a standard deviation of data values.

19. The computer-implemented method of claim 17, wherein the deployed predictive model compares semantic meaning of words included in the one or more datasets to words of the stored data of the one or more stored datasets.

20. The computer-implemented method of claim 17, wherein the deployed predictive model compares column names of columns of the one or more datasets to stored data column names of the one or more stored datasets.

* * * * *